US005809182A

United States Patent [19]
Ward et al.

[11] Patent Number: 5,809,182
[45] Date of Patent: Sep. 15, 1998

[54] DIGITAL RESAMPLING INTEGRATED CIRCUIT FOR FAST IMAGE RESIZING APPLICATIONS

[75] Inventors: Joseph Ward, Hilton; William A. Cook, Rochester; Thomas Neal Berarducci, Webster, all of N.Y.; Lionel J. D'luna, Newport Beach, Calif.

[73] Assignee: Eastman Kodak Company, Rochester, N.Y.

[21] Appl. No.: 697,388

[22] Filed: Aug. 23, 1996

Related U.S. Application Data

[63] Continuation of Ser. No. 469,166, Jun. 6, 1995, abandoned, which is a continuation of Ser. No. 122,350, Sep. 17, 1993, abandoned.

[51] Int. Cl.[6] .................................................. G06K 9/32
[52] U.S. Cl. ........................... 382/298; 382/300; 382/260
[58] Field of Search ..................................... 382/276, 293, 382/298, 300, 260; 345/127, 130; 348/581; 358/528

[56] References Cited

U.S. PATENT DOCUMENTS

| | | | |
|---|---|---|---|
| 4,283,765 | 8/1981 | Rieger | 382/47 |
| 4,328,426 | 5/1982 | D'Ortenzio | 250/578 |
| 4,381,547 | 4/1983 | Ejiri | 382/47 |
| 4,703,353 | 10/1987 | David | 358/140 |
| 4,809,345 | 2/1989 | Tabata | 382/300 |
| 4,819,190 | 4/1989 | Hinman et al. | 364/521 |
| 4,829,587 | 5/1989 | Glazer et al. | 382/47 |
| 4,850,027 | 7/1989 | Kimmel | 382/41 |
| 4,885,786 | 12/1989 | Anderson et al. | 382/47 |
| 4,988,984 | 1/1991 | Gonzalez-Lopez | 340/728 |
| 5,008,752 | 4/1991 | Van Nostand | 348/581 |
| 5,046,117 | 9/1991 | Yamashita | 382/47 |
| 5,054,099 | 10/1991 | Wakabayashi et al. | 382/47 |
| 5,068,905 | 11/1991 | Hackett et al. | 382/47 |
| 5,107,254 | 4/1992 | Choi | 340/731 |
| 5,113,455 | 5/1992 | Scott | 382/47 |
| 5,140,648 | 8/1992 | Hackett et al. | 382/47 |
| 5,195,050 | 3/1993 | Hsu et al. | 364/728.01 |
| 5,305,398 | 4/1994 | Klein et al. | 382/47 |
| 5,319,383 | 6/1994 | Grothe et al. | 382/47 |
| 5,325,449 | 6/1994 | Burt et al. | 382/240 |
| 5,437,045 | 7/1995 | Davies | 382/293 |

FOREIGN PATENT DOCUMENTS

| | | |
|---|---|---|
| 0093429 | 9/1983 | European Pat. Off. . |
| 0527693 | 7/1993 | European Pat. Off. . |
| WO90/00780 | 1/1990 | WIPO . |

OTHER PUBLICATIONS

Xerox Disclos Journal, vol. 18, No. 4, Aug. 1993, Stamford, USA pp. 451–461 "Hardware Architecture for Nearest Neighbor Image Processing Algorithms" Coward and Parker.

Primary Examiner—Yon J. Couso
Attorney, Agent, or Firm—Norman Rushefsky

[57] ABSTRACT

A resampling application specific integrated circuit (RSA) supports image interpolation or decimation by any arbitrary factor in order to provide flexibility, and utilizes a neighborhood of up to 9×9 pixels to produce image data of high quality. The RSA contains a separate vertical and horizontal filter units for vertical resizing and horizontal resizing operations, vertical and horizontal position accumulator units, a configuration register unit for loading the vertical and horizontal position accumulator units, and a memory management unit to interface the RSA to external memory banks. The vertical and horizontal filter units contain nine multipliers and nine corresponding coefficient memories, with each memory preferably containing storage space for thirty-two coefficients. The coefficients are addressed on a pixel by pixel basis in response to the outputs of the vertical and horizontal position accumulator units. The RSA is designed to handle an input data stream that contains multiple color components and simultaneously resizes all of the color components.

33 Claims, 9 Drawing Sheets

5,809,182

DIGITAL RESAMPLING INTEGRATED CIRCUIT FOR FAST IMAGE RESIZING APPLICATIONS

This is a Continuation of U.S. application Ser. No. 08/469,166, filed Jun. 6, 1995 now abandoned which in turn is a Continuation of U.S. application Ser. No. 08/122,350, filed 17 Sep. 1993 now abandoned.

FIELD OF THE INVENTION

The invention relates generally to digital image processing systems and, more specifically, to digital image processing systems that perform image resizing or resampling.

BACKGROUND

Image resizing or resampling is an important operation in many digital imaging systems, including film or print scanners, image processing accelerators, and digital hardcopy printers, and is used to enlarge (interpolation) or reduce (decimation) the size of a digital image. Each pixel of a resized image is computed as a weighted average of an N×N neighborhood of pixels of an original image as a result of a resizing operation. Thus, a resizing operation is similar to image filtering or convolution operations. In image filtering, however, the output pixel sampling grids are identical and the same weights or filter coefficients are used to compute each output pixel; while in image resizing, the output pixel locations are different than the input locations, the weights used to compute each output pixel depend on the distance between the output pixels and the input sampling grid, and the weights can be different for each output pixel.

Several different types of calculations must be performed to resize an entire image including: the calculation of the positions of the output image pixels relative to the input sampling grid for a given factor of decimation or interpolation; the calculation of addresses of filter kernel coefficients from the position values; and the calculation of each output pixel value using the filter coefficients and the pixels in the N×N neighborhood. Performing an image resizing operation on a personal computer or workstation using software routines is therefore impractical, due to the large number of multiplication and addition operations that must be performed. Thus, image resizing operations have generally been performed in digital image processing systems using specialized hardware such as customized integrated circuit devices.

Current hardware solutions for performing image resizing are limited by a number of factors, including the requirement for a number of separate integrated circuit chips (ICs) to: 1) perform pixel position and address calculation; 2) store interpolation filter coefficients; and 3) multiply/add input pixels and coefficients to compute output pixel values (i.e. a convolver IC). The use of multiple ICs increases the expense of the system and consumes a comparatively large amount of circuit board space. In addition, currently available convolver ICs that also allow the filter coefficient to be changed on a pixel by pixel basis (for example the TMC2246 device manufactured by TRW, Inc. or the L64260 device manufactured by LSI Logic, Inc.) have only four multipliers, which limits the size of the neighborhood that can be used to compute the output pixels to a 4×4 neighborhood. The limitation of the size of the neighborhood is a significant disadvantage, as the use of large neighborhoods reduces aliasing artifacts in an output image and produces a more visually appealing result. Currently available convolver ICs that support neighborhoods or kernels of up to 9×9 pixels (for example the TMC2250 device manufactured by TRW, Inc. or the L64243 device manufactured by LSI Logic, Inc.) do not allow the filter coefficients to be selected on a pixel by pixel basis. Finally, current convolver ICs are not suited for use with input image data sources that contain more than one color component of an image that might be produced, for example, by a color film scanner.

SUMMARY OF THE INVENTION

The invention provides a resampling application specific integrated circuit (RSA) that can be utilized to perform multiple functions including image filtering, image resampling, and image compression/decompression. The RSA supports image interpolation or decimation by any arbitrary factor in order to provide flexibility, and utilizes a neighborhood of up to 9×9 pixels to produce images of high quality. The RSA contains a separate vertical and horizontal filter units for vertical resizing and horizontal resizing operations, vertical and horizontal position accumulator units, a configuration register unit for loading the vertical and horizontal position accumulator units, and a memory management unit to interface the RSA to a plurality of external memory banks. The vertical and horizontal filter units preferably contain nine multipliers and nine corresponding coefficient memories, with each memory preferably containing storage space for thirty-two coefficients. The coefficients are addressed on a pixel by pixel basis in response to the outputs of the vertical and horizontal position accumulator units. The RSA is designed to handle an input data stream that contains multiple color components and simultaneously resizes all of the color components.

BRIEF DESCRIPTION OF THE DRAWINGS

Reference should now be made to the following detailed description of the best mode of carrying out the invention and the accompanying drawings, wherein.

BEST MODE OF CARRYING OUT THE INVENTION

Figure 1:
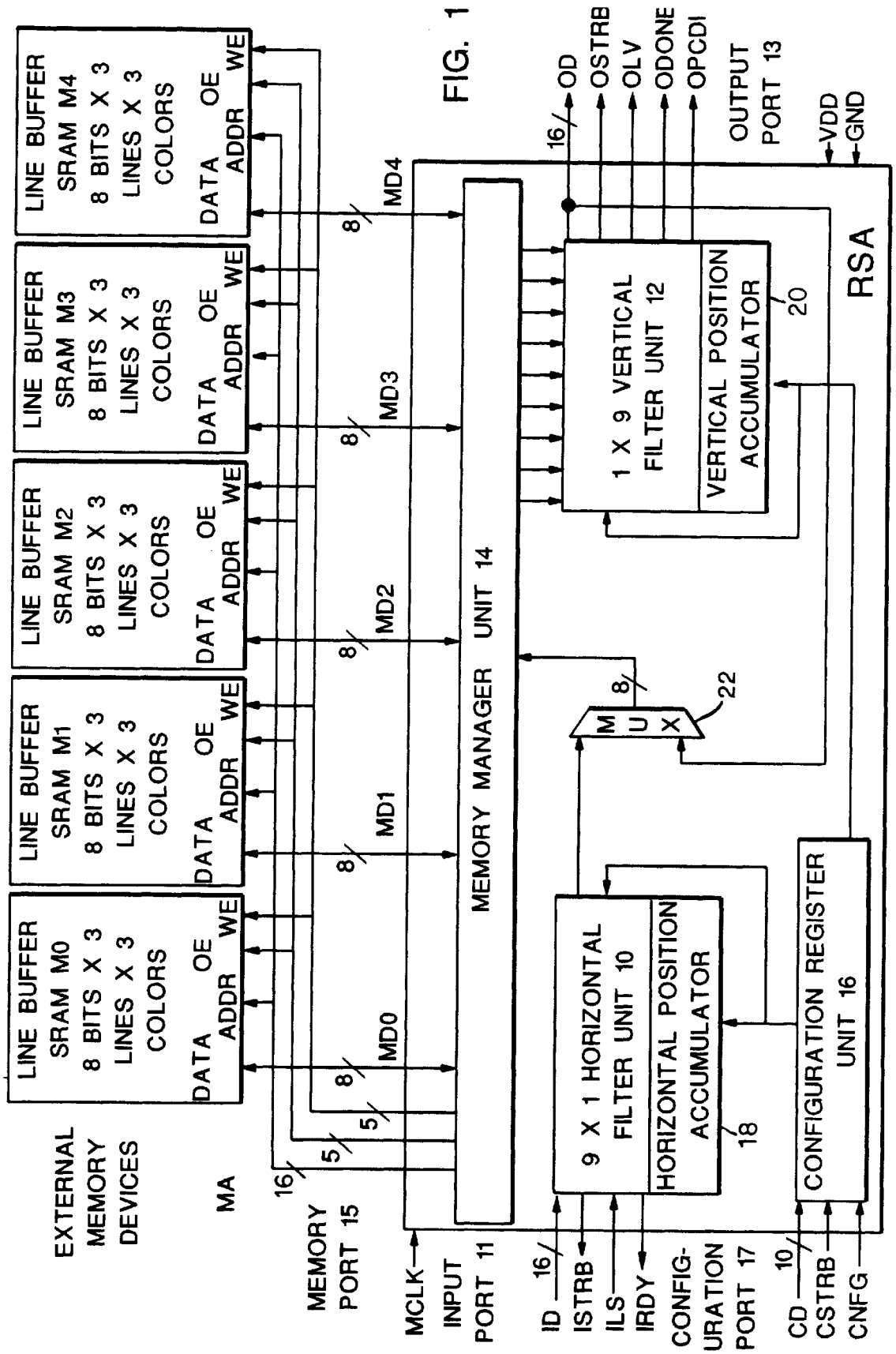
FIG. 1 is a schematic block diagram of an RSA in accordance with the present invention.

An RSA in accordance with the invention is shown in FIG. 1. The RSA includes a horizontal filter unit 10 coupled to an input port 11, a vertical filter unit 12 coupled to an output port 13, a memory manager unit 14 coupled to a memory port 15, a configuration register unit 16 coupled to a configuration port 17, and horizontal and vertical position accumulators 18, 20 respectively coupled to the horizontal and vertical filter units 10, 12 and the configuration register unit 16. The outputs of the horizontal filter unit 10 and the vertical filter unit 12 are also coupled to a multiplexer (MUX) 22, thereby permitting the output from the vertical filter unit 12 to be selectively recirculated back to the input of memory manager unit 14. Each of the components of the RSA are integrated in a single IC.

The input port 11, output port 13 and memory port 15 are used to transfer data and control signals between the RSA and external devices. The input port 11 includes a sixteen bit input data bus (ID), an input data strobe line (ISTRB), which the RSA asserts to request input pixel data, an input line start line (ILS), which an external device asserts when a complete line of input image data is available to the RSA to read, and an input ready line (IRDY), which the RSA asserts when it is ready to accept the next line of input image data. Similarly, the output port 13 includes a sixteen bit output data bus (OD), an output data strobe (OSTRB), which the RSA asserts when valid output image data is present on the output data bus, and output line valid line (OLV) which the RSA asserts while producing all pixels for a given line of output image data and deasserts between consecutive lines of output image data, an output image done line (ODONE), which the RSA asserts after all lines of an output image have been output, and finally an output photo CD interpolation line (OPCDI), which the RSA asserts to indicate that interpolated data is being output on the output data bus OD. In the illustrated embodiment, the memory port 15 preferably includes a sixteen bit memory address bus (MA), five separate eight bit bidirectional memory bank data buses (MD0–MD4), five memory write enable lines (MWE), and five memory output enable lines (OE), all of which are respectively coupled to external memory banks M0–M4. The configuration port 17 includes a ten bit configuration data bus (CD), which is used to load configuration data and coefficient data into the RSA, a configuration data strobe line (CSTRB), the rising edge of which is preferably used to load the configuration register and coefficient memories (which will be described in greater detail below), and a configuration/coefficient select line (CNFB), which is set high to load the configuration registers and set low to load the coefficient memories. Other connections to the RSA include a master clock line (MCLK), a voltage supply line (VDD) and a logic ground (GND). The MCLK is used to supply a 33 MHz external master clock signal to the RSA, which in turn uses the signal to generate internal timing and external control signals.

Figure 2:
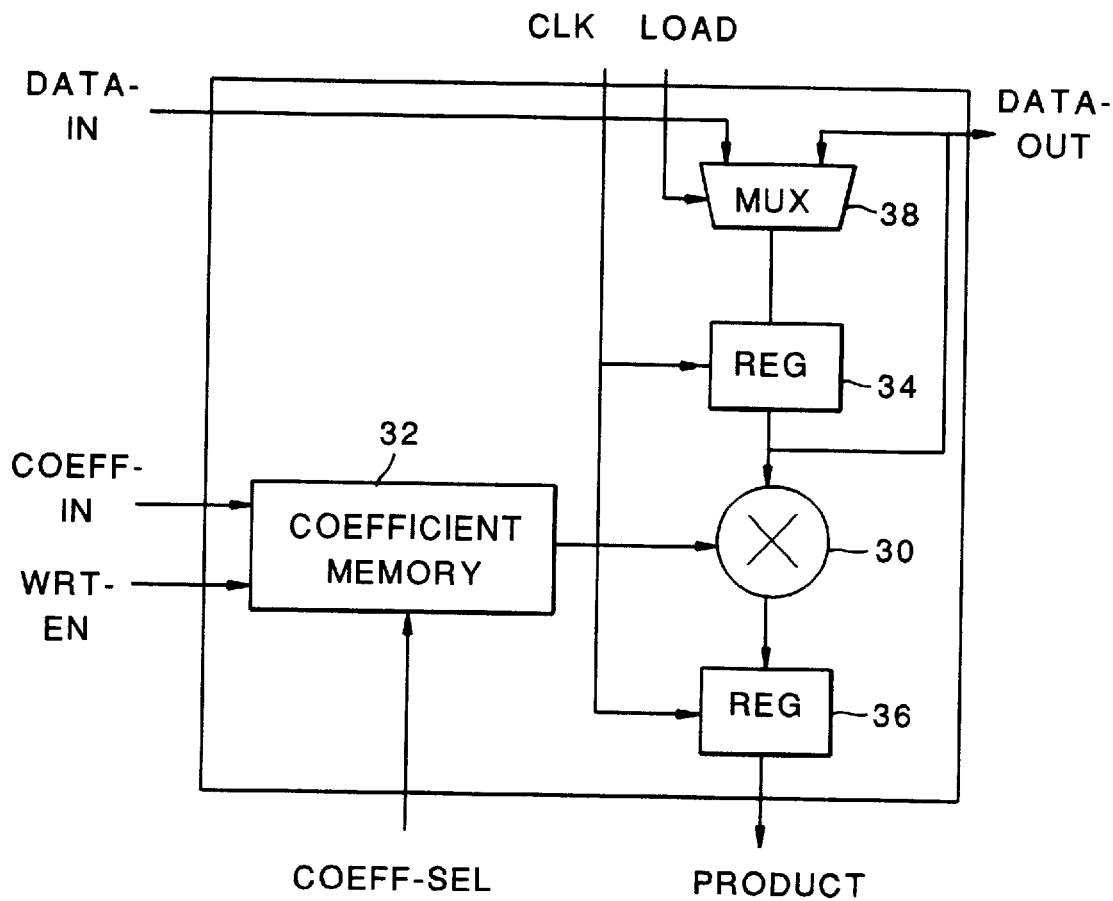
FIG. 2 is a schematic diagram of a filter tap used in the horizontal and vertical filter units illustrated in FIG. 1.

The horizontal filter unit 10 and the vertical filter unit 12 each consist of nine tap elements, numbered 0 to 8, and a nine input adder. Each tap element, as shown in FIG. 2, preferably includes an 8-bit by 8-bit multiplier 30, a 32-word by 8-bit coefficient RAM memory 32 for coefficient storage, input and output registers 34, 36, and a multiplexer 38 for selecting the multiplier input data. The coefficient memories for all of the tap elements are loaded through the configuration register unit 16. For each pixel, one of 32 coefficients is selected by the horizontal and vertical position accumulator units 18, 20 via the COEFF-SEL input. For the horizontal filter unit 10, the DATA-IN port of tap 0 is connected to the input port of the RSA. The DATA-OUT port of each horizontal filter tap element feeds the DATA-IN port of the next tap element, with the DATA-OUT port of tap 8 unconnected. For the vertical filter unit 12, all nine DATA-IN ports are connected in parallel to the memory manager unit 14. In each filter unit 10, 12, the nine PRODUCT ports are connected to a 9-input adder (not shown) that computes the sum of the nine-products. The output of the adder is then scaled and rounded to eight bits, and sent to the memory port 15 of the RSA in the case of the horizontal filter unit 10, or to the output port 13 of the RSA for the vertical filter unit 12.

Figure 3:
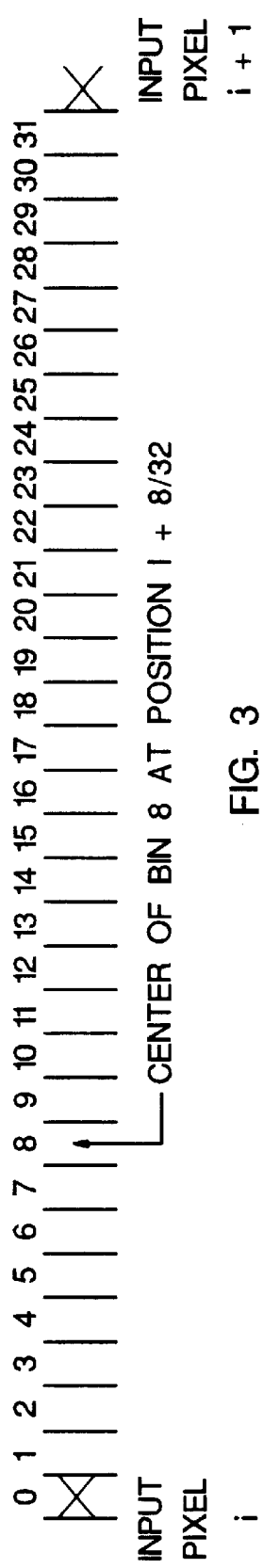
FIG. 3 illustrates the division of the input pixel interval into bins.

The horizontal and vertical filter units 10, 12 are respectively controlled by the horizontal and vertical position accumulators 18, 20. The position accumulators calculate the position of each output pixel or line, which in turn determines which set of filter coefficients and which image data are to be used for each calculation. The RSA divides the interval between input(pixels (lines) into 32 sub-intervals, or bins, as shown in FIG. 3. Bin n' is centered at position i+n'/32, and extends +/−1/64 input pixel from its center, where i is the integer part of an output pixel position and n' is a bin or sub-pixel index, as will be described in greater detail below. Each bin corresponds to a set of filter coefficients, and a location in the coefficient memory for each filter tap element.

In operation, the output pixel and line spacing values for a desired amount of image resizing are loaded into horizontal and vertical position accumulator units. These values are defined as the number of input pixels divided by the number of output pixels (lines). Thus, the output pixel or line spacing will be less than one for an interpolation operation, and will be greater than one for a decimation operation. The output pixel and line spacing values are represented with a 3-bit integer part and a 16-bit fractional part. Thus, the maximum distance between output pixels (lines) is 7.99998 input pixels (lines). Starting at position 0.0, the horizontal and vertical position accumulator units increment by the pixel (line) spacing for each pixel, and maintain the position of the current output pixel (line). The current output pixel and line positions are represented with a 13-bit integer part (to span input images up to 8192×8192) and a 16-bit fractional part. For a given output pixel, the integer part of its position corresponds to i in the image resampling equation. It determines which input data are used to compute the current output pixel. The fractional part of the output position represents how close the output location is to the input sampling grid. This fractional position specifies which bin, n', the output pixel falls in, and is used to select which set of filter coefficients to apply to the surrounding input pixels. The fractional part of each output position is rounded to the nearest 1/32nd and multiplied by 32 to produce the bin number, from 0 to 31.

Figure 4:
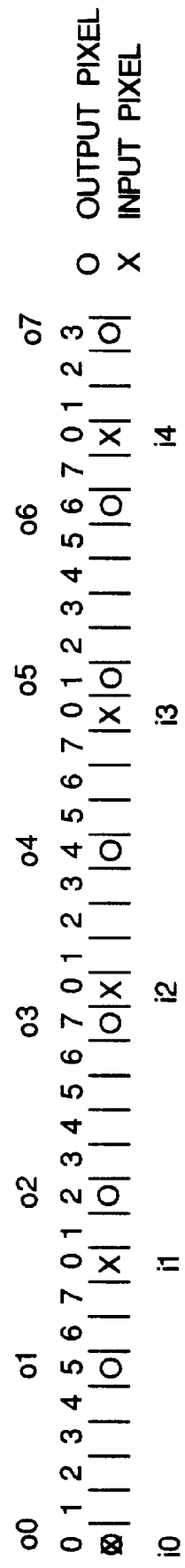
FIG. 4 illustrates the output pixel positions for a 1.6× example interpolation.

For example, consider an input line of five pixels and an output line of eight pixels, or interpolation by a factor of 1.6. The output pixel spacing is thus 5/8=0.625 input pixels. FIG. 4 illustrates the positions of the output pixels, where for clarity, only 8 bins are shown. Assuming that a 4-tap interpolation mode of operation is employed, output pixel o2 is computed from input pixels i0, i1, i2, and i3, and the coefficient set of bin 5 (of 8). Output pixel o3 is also computed from input pixels i0, i1, i2 and i3, but uses the coefficient set for bin 7 (of 8).

The function of the memory management unit 14 is to interface the RSA to the external memory banks (M0–M4) for storage of intermediate data, and to control the inputs to the vertical filter unit 12. When the vertical filter unit is configured for a 4-tap mode of operation, all five memory banks are active. Only four banks are used when the vertical filter unit 12 is configured in a 9-tap mode of operation. All five memory banks are also used when a compression/ decompression mode of operation (utilizing, for example, a hierarchical or pyramid compression algorithm of the type discussed in U.S. Pat. No. 4,969,204, the contents of which are herein incorporated by reference) is employed. The memory management unit 14 interleaves writes to the external memory banks M0–M4 from the horizontal filter unit 10 with reads from the memory banks M0–M4 by the vertical filter unit 12, so that both filter units can run simultaneously. Multiplexers within the memory management unit 14 direct data from each memory bank to the appropriate filter tap based on the selected mode of operation of the RSA.

In either an image filtering or image resample mode, the RSA can accept three-color line interleaved input image data. If this three-color mode is chosen, each external SRAM must be large enough to store three lines of each of three color components, or nine horizontally resampled/ filtered lines total.

Figure 5:
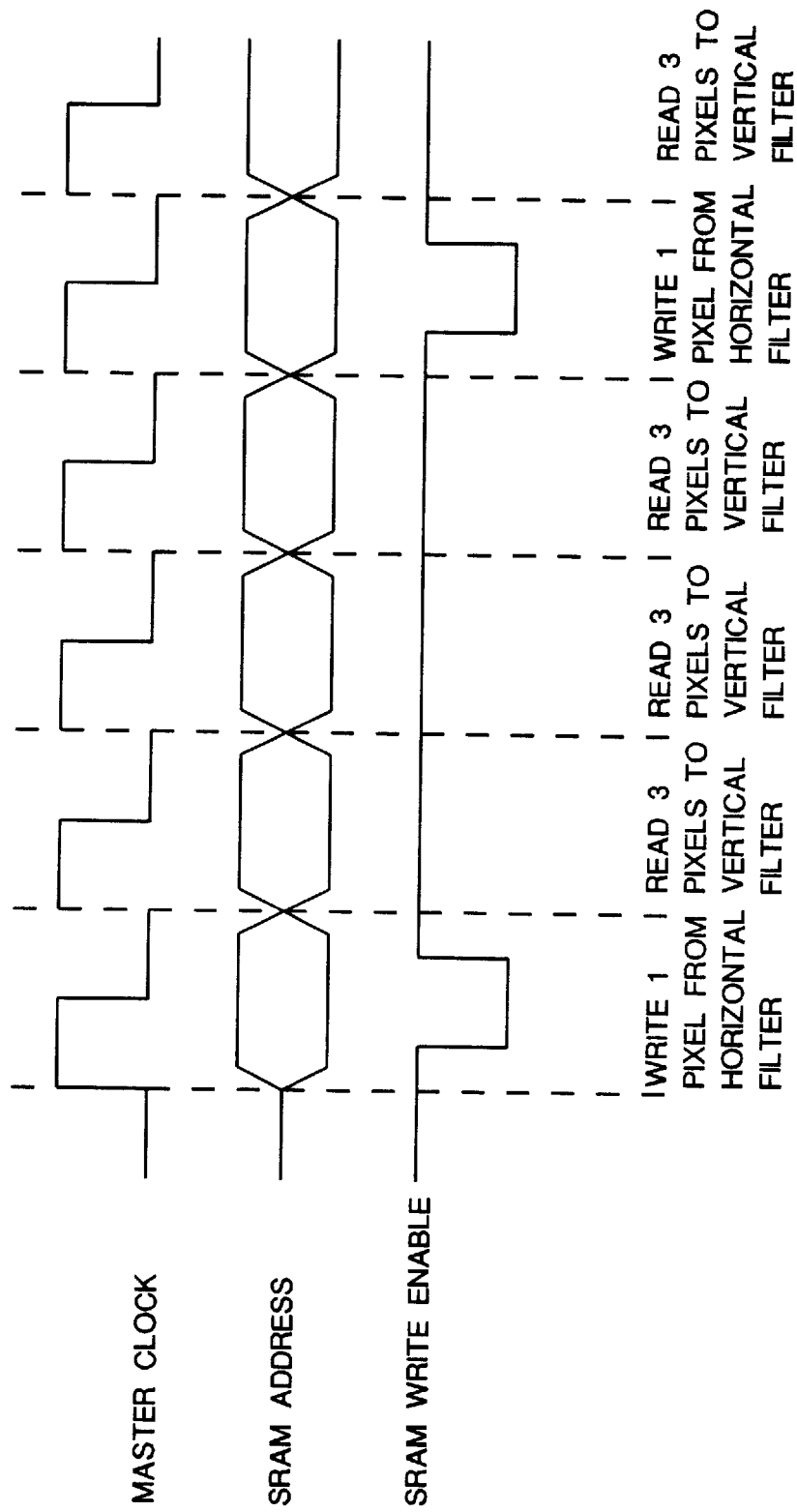
FIG. 5 is a timing diagram illustrating the operation of the RSA shown in FIG. 1 in a nine tap/four memory bank mode of operation.

When the vertical filter unit 12 is configured for a 9-tap mode of operation, four memory banks are utilized. Each SRAM memory bank stores three lines of horizontally resampled/filtered data, and thus the four banks together implement a 12-line circular buffer. Image data is stored in groups, such that three consecutive memory locations contain the same number pixel for three adjacent lines. In this manner, each column of nine horizontally resample/filtered pixels is read by performing three read cycles to consecutive addresses, with each read cycle accessing three memory banks in parallel. The memory management unit 14 always reads the sine oldest lines from the circular buffer and routes these nine lines to the appropriate taps of the vertical filter unit 12. In between sets of three memory reads, the memory management unit 14 writes one horizontally filtered pixel to one of the four memory banks. FIG. 5 shows the timing for this mode of operation, and the concurrent operation of both filter units.

For two or three color images pixels from the different color components are stored at memory locations separated by two or three times the line length. In other words, if the input image is line-interleaved RGB data, all R pixels from three lines of the image are stored together followed by all G pixels from the same three lines, followed by all the B pixels from the same lines.

Figure 6:
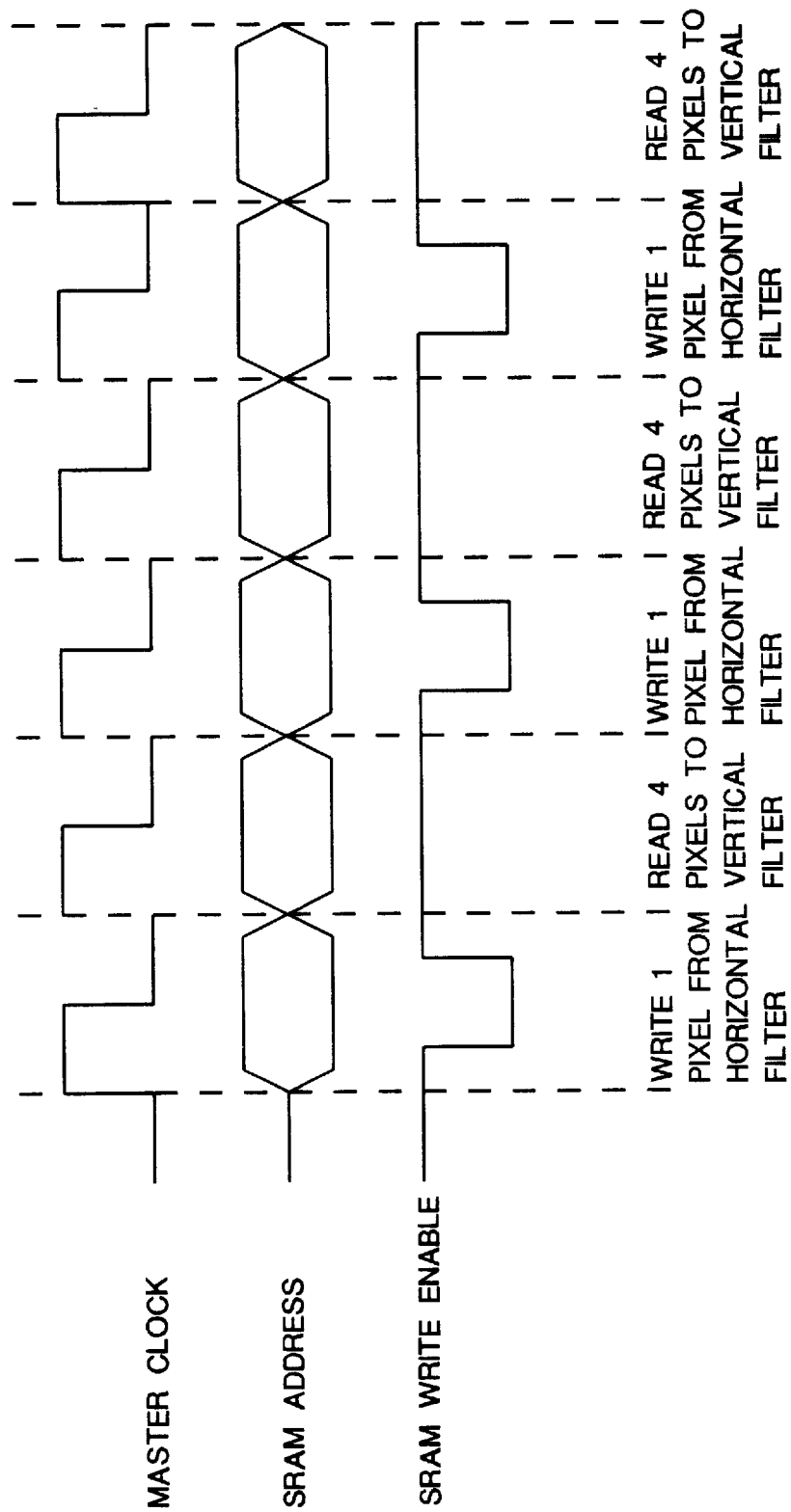
FIG. 6 is a timing diagram illustrating the operation of the RSA shown in FIG. 1 in a four tap/five memory bank mode of operation.

When the vertical filter unit 12 is configured for 4-tap operation, all five memory banks are used to store a single line of horizontally resampled/filtered data. Thus, the five banks implement a five line circular buffer. Four adjacent lines are read in parallel from four of the five banks and input to the vertical filter, while the current output of the horizontal filter is written to one of the five banks. FIG. 6 shows the timing for this mode of operation.

Depending on the amount of image resizing, and the position of the output line being computed, both filter units may not be active. For example, consider the case of 2× interpolation in a 4-tap mode of operation. For 2× interpolation, the vertical filter unit 12 must produce twice the number of lines as the horizontal filter unit 10. FIG. 6 demonstrates the case where both horizontal and vertical filter units 10, 12 are active. When the horizontal filter unit is not active, as in 2× interpolation, the vertical filter unit 12 reads a column of four pixels on every master clock cycle.

Figure 7:
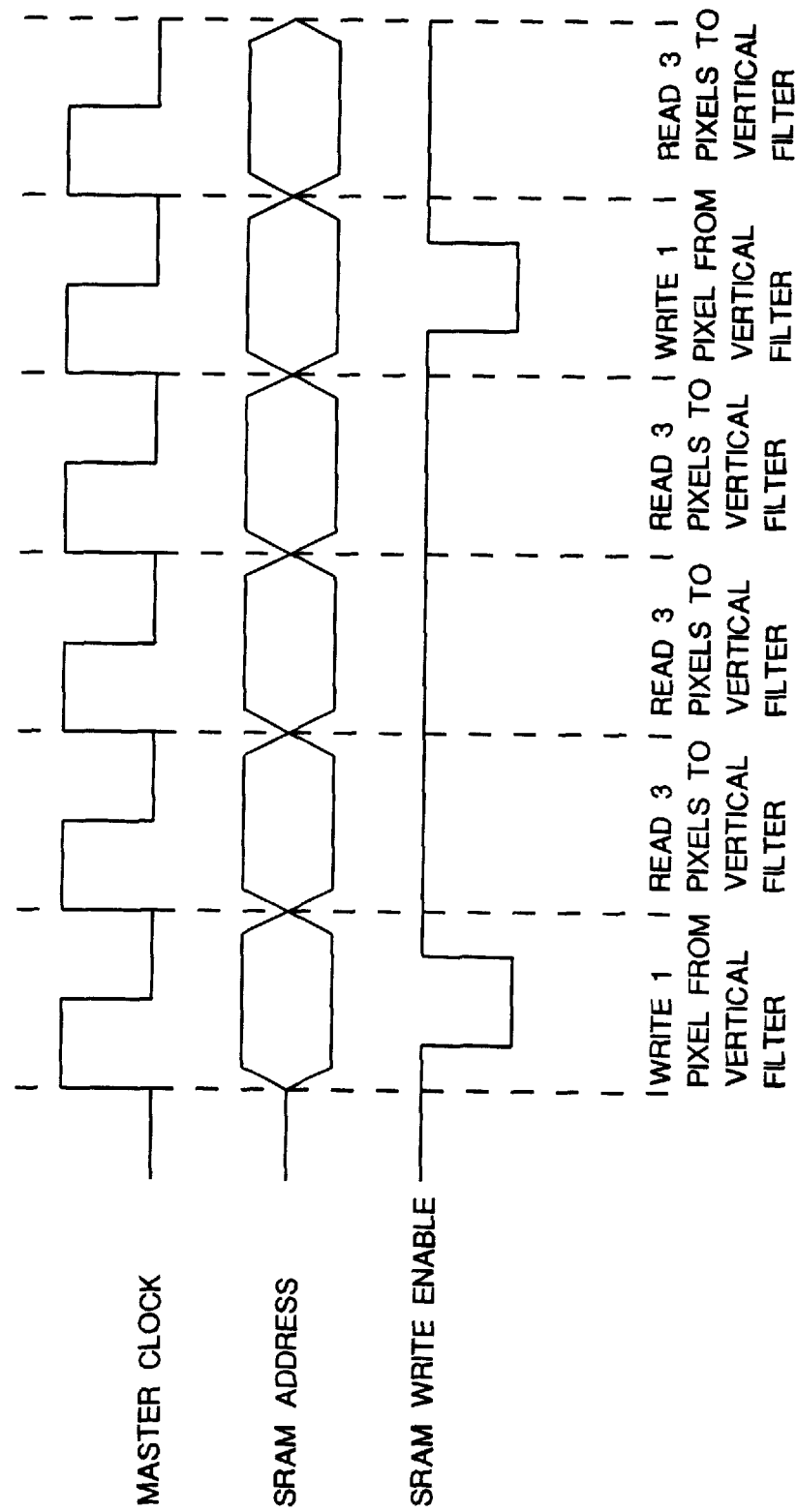
FIG. 7 is a timing diagram illustrating the operation of the RSA shown in FIG. 1 in a photo CD compression/decompression mode while vertical filter filtering.
Figure 8:
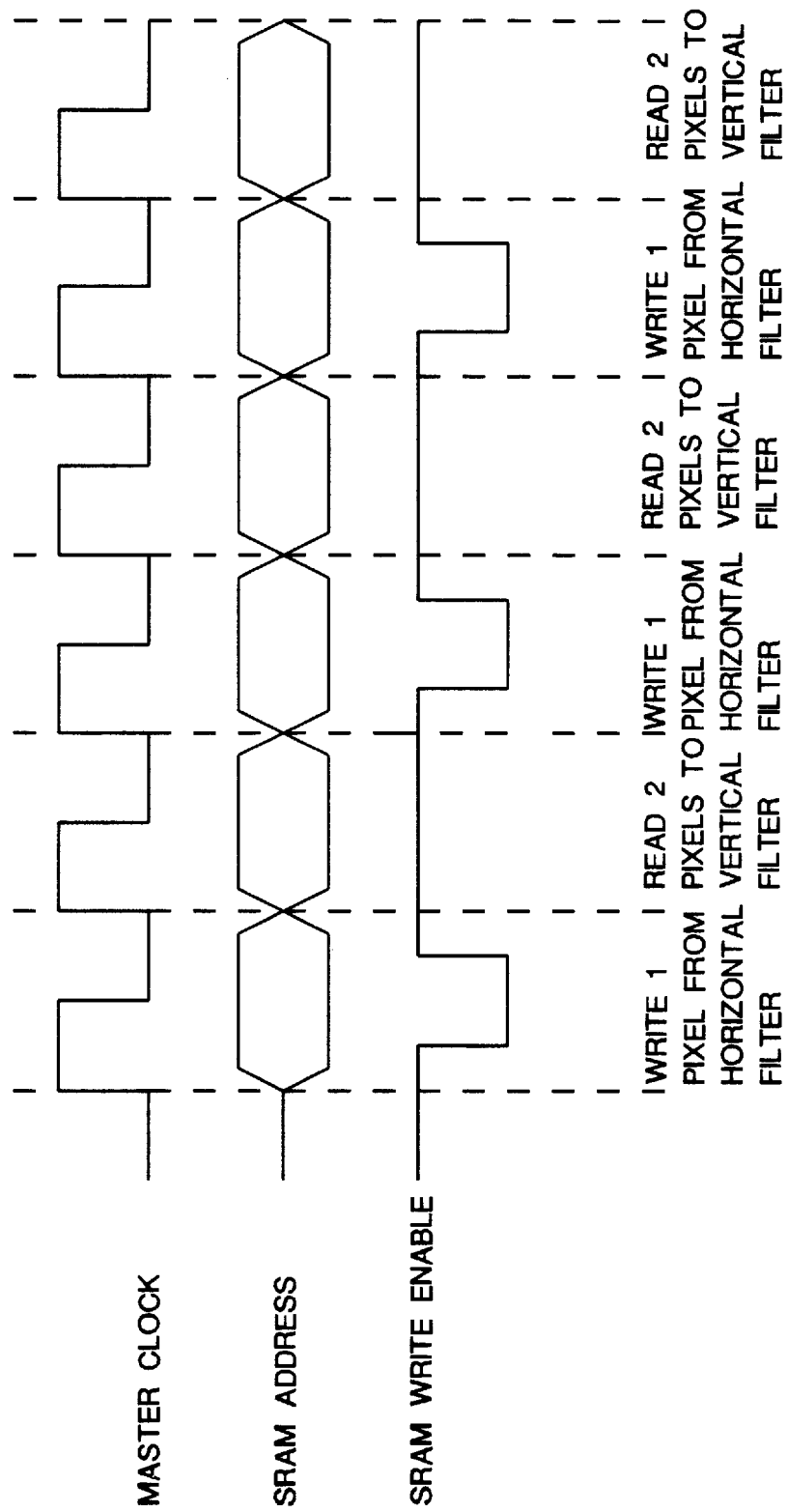
FIG. 8 is a timing diagram illustrating the operation of the RSA shown in FIG. 1 in a photo CD compression/decompression mode while vertical filter interpolating.

All five memory banks are used when the RSA operates in the compression/decompression mode. Three banks are used to store nine lines of the horizontally resample/filtered data in a manner similar to the 9-tap mode of operation. The other two banks are used to store two lines of both horizontally and vertically filtered data, one line per bank. The vertical filter unit 12 alternates between producing filtered data and bilinearly interpolated data as will be described in greater detail below. When filtering, the memory manager unit 14 reads data from nine lines of the horizontally filtered image from banks M0, M1 and M2 in three read cycles, and routes the data to the appropriate filter tap. The output of the vertical filter unit 14 is written by the memory manager unit 14 alternately to banks M3 and M4. The timing is similar to a 9-tap/4-bank mode of operation where four clock cycles are required for reading (3) and writing (1). The horizontal filter unit 10 cannot be active when the vertical filter unit 12 is operating in this mode, because the memory manager unit 14 is configured to write data from the vertical filter unit 12. When the vertical filter unit 12 is generating interpolated data, the memory manager unit 14 reads data from banks M3 and M4 in parallel and directs data from bank M3 to filter tap 0, and data from bank 4 to filter tap 2. Successive reads cause the data value from tap 0 to be shifted into tap 1 and the data value from tap 2 to be shifted into tap 3. The horizontal filter unit 10 can be active when the vertical filter unit 12 is performing interpolation. The results from the horizontal filter unit 10 are written into one of banks M0, M1 or M2, replacing the data from the oldest line stored in memory. The timing is similar to that of a 4-tap/5-bank mode of operation. FIGS. 7 and 8 illustrate the timing for the compression/ decompression mode of operation.

The following tables further illustrate how pixel data is mapped into memory for various modes of operation. The tables illustrate the mappings for the initial set of lines in an image. Each line has four pixels and two color components. The entry "p2 14 c1" represents pixel zero (the first pixel), line four, color component 1. The data enters the memory management unit 14 in line interleaved color, where pixels 0, 4 of color component 0 are followed by pixels 0, 4 of color component 1 for a given line. The mapping strategy would work equally well with pixel interleaved color, where the data would enter p0 c0, p0 c1, p1 c0 . . . p3 c0, p3 c1.

Table 1 shows the mapping for the first four lines of data in a 4-tap/5-bank mode of operation, wherein a single line of pixel data is stored in each memory bank. If a third color component were used, its data would occupy locations 8–12. To use data from lines 0–3, data is read from all five banks in parallel from addresses 0–7. The data from banks M0–M3 is directed to the appropriate filter tap and data from bank M4 is ignored. When writing, data from the oldest line in memory is replaced with the next incoming line; data from input line 5 would replace the data from line 0 bank M0, data from line 6 would replace the data from line 1, etc.

TABLE 1

| | MEMORY BANK | | | | |
|---|---|---|---|---|---|
| Address | 0 | 1 | 2 | 3 | 4 |
| 0 | p0 10 c0 | p0 11 c0 | p0 12 c0 | p0 13 c0 | p0 14 c0 |
| 1 | p1 10 c0 | p1 11 c0 | p1 12 c0 | p1 13 c0 | p1 14 c0 |
| 2 | p2 10 c0 | p2 11 c0 | p2 12 c0 | p2 13 c0 | p2 14 c0 |
| 3 | p3 10 c0 | p3 11 c0 | p3 13 c0 | p3 13 c0 | p3 14 c0 |
| 4 | p0 10 c1 | p0 11 c1 | p0 12 c1 | p0 13 c1 | p0 14 c1 |
| 5 | p1 10 c1 | p1 11 c1 | p1 12 c1 | p1 13 c1 | p1 14 c1 |
| 6 | p2 10 c1 | p2 11 c1 | p2 12 c1 | p2 13 c1 | p2 14 c1 |
| 7 | p3 10 c1 | p3 11 c1 | p3 12 c1 | p3 13 c1 | p3 14 c1 |

Table 2 illustrates the mapping for the first twelve lines of pixel data with the vertical filter unit 12 operating in a 9-tap/4-bank mode of operation. Again, two color components are shown. A third color component would occupy locations 24–35. Lines are stored in groups of three so that reading three successive locations will produce data from twelve lines (all four banks being read in parallel). The data from the nine newest lines are directed to the appropriate filter tap for processing. When writing, data from the oldest line is replaced. When reading lines 3–11, data from banks M1, M2 and M3 are routed to tap 0 to 8 of the vertical filter unit 12, with read cycles necessary to retrieve nine bits of data. Data is directed from the memory banks to the filter taps as follows: data from banks M1, M2 and M3 are directed to taps 0, 3 and 6 on the first read cycle; data is directed to taps 1, 4 and 7 on the second cycle; and the data is directed to taps 2, 5 and 8 on the third cycle. Data from line 0 in bank M0 is replaced with data from line 12. When line 13 is being written, data from lines 4 to 12 is being processed. Therefore, on the first of the three read cycles, data from banks M0, M2 and M3 are directed to taps 8, 2 and 5, data from banks 1, 2 and 3 is directed to taps 0, 3 and 6 on the second cycle, and from banks 1, 2 and 3 is directed to taps 1, 4 and 7 on the third cycle data.

TABLE 2

| | MEMORY BANK | | | | |
|---|---|---|---|---|---|
| Address | 0 | 1 | 2 | 3 | 4 |
| 0 | p0 10 c0 | p0 13 c0 | p0 16 c0 | p0 19 c0 | unused |
| 1 | p0 11 c0 | p0 14 c0 | p0 17 c0 | p0 110 c0 | . |
| 2 | p0 12 c0 | p0 15 c0 | p0 18 c0 | p0 111 c0 | . |
| 3 | p1 10 c0 | p1 13 c0 | p1 16 c0 | p1 19 c0 | . |
| 4 | p1 11 c0 | p1 14 c0 | p1 17 c0 | p1 110 c0 | . |
| 5 | p1 12 c0 | p1 15 c0 | p1 18 c0 | p1 111 c0 | . |
| 6 | p2 10 c0 | p2 13 c0 | p2 16 c0 | p2 19 c0 | . |
| 7 | p2 11 c0 | p2 14 c0 | p2 17 c0 | p2 110 c0 | . |
| 8 | p2 12 c0 | p2 15 c0 | p2 18 c0 | p2 111 c0 | . |
| 9 | p3 10 c0 | p3 13 c0 | p3 16 c0 | p3 19 c0 | . |
| 10 | p3 11 c0 | p3 14 c0 | p3 17 c0 | p3 110 c0 | . |
| 11 | p3 12 c0 | p3 15 c0 | p3 18 c0 | p3 111 c0 | . |
| 12 | p0 10 c1 | p0 13 c1 | p0 16 c1 | p0 19 c1 | . |
| 13 | p0 11 c1 | p0 14 c1 | p0 17 c1 | p0 110 c1 | . |
| 14 | p0 12 c1 | p0 15 c1 | p0 18 c1 | p0 111 c1 | . |
| 15 | p1 10 c1 | p1 13 c1 | p1 16 c1 | p1 19 c1 | . |
| 16 | p1 11 c1 | p1 14 c1 | p1 17 c1 | p1 110 c1 | . |
| 17 | p1 12 c1 | p1 15 c1 | p1 18 c1 | p1 111 c1 | . |
| 18 | p2 10 c1 | p2 13 c1 | p2 16 c1 | p2 19 c1 | . |
| 19 | p2 11 c1 | p2 14 c1 | p2 17 c1 | p2 110 c1 | . |
| 20 | p2 12 c1 | p2 15 c1 | p2 18 c1 | p2 111 c1 | . |
| 21 | p3 10 c1 | p3 13 c1 | p3 16 c1 | p3 19 c1 | . |
| 22 | p3 11 c1 | p3 14 c1 | p3 17 c1 | p3 110 c1 | . |
| 23 | p3 12 c1 | p3 15 c1 | p3 18 c1 | p3 111 c1 | unused |

Table 3 illustrates a memory map after the first nine input lines and the first two decimated output lines that have been processed in the compression/decompression mode of operation. Three memory banks are used to store pixel data from nine lines of the horizontally filtered image, using the same mapping strategy as in the nine-tap mode of operation. The difference is that only nine lines are stored in three banks. The new input lines from the horizontal filter unit 10 cannot be written when the vertical filter unit 12 is processing the data in banks M0, M1 and M2. Instead, the output of the vertical filter unit 12 is written to one of banks 3 and 4. Even numbered lines are written to bank 3 and odd numbered lines are written to bank 4. This data is then read back into the vertical filter unit 12 to compute an 2x or 4x interpolated image using bilinear interpolation. Both banks M3 and M4 are read in parallel. Data from bank M3 is directed to tap 0. Data from bank M4 is directed to tap 2. During the time the vertical filter unit 12 is processing data from banks M3 and M4, new data from the horizontal filter unit 10 is written to one of banks M0, M1 or M2 replacing the data from the oldest line currently in memory.

TABLE 3

| | MEMORY BANK | | | | |
|---|---|---|---|---|---|
| Address | 0 | 1 | 2 | 3 | 4 |
| 0 | po 10 c0 | p0 13 c0 | p0 16 c0 | op0 10 c0 | op0 11 c0 |
| 1 | p0 11 c0 | p0 14 c0 | p0 17 c0 | op1 10 c0 | op1 11 c0 |
| 2 | p0 12 c0 | p0 15 c0 | p0 18 c0 | op2 10 c0 | op2 11 c0 |
| 3 | p1 10 c0 | p1 13 c0 | p1 16 c0 | op3 10 c0 | op3 11 c0 |
| 4 | p1 11 c0 | p1 14 c0 | p1 17 c0 | op0 10 c1 | op0 11 c1 |
| 5 | p1 12 c0 | p1 15 c0 | p1 18 c0 | op1 10 c1 | op1 11 c1 |
| 6 | p2 10 c0 | p2 13 c0 | p2 16 c0 | op2 10 c1 | op2 11 c1 |
| 7 | p2 11 c0 | p2 14 c0 | p2 17 c0 | op3 10 c1 | op3 11 c1 |
| 8 | p2 12 c0 | p2 15 c0 | p2 18 c0 | | |
| 9 | p2 10 c0 | p3 13 c0 | p3 16 c0 | | |
| 10 | p3 11 c0 | p3 14 c0 | p3 17 c0 | | |
| 11 | p3 12 c0 | p3 15 c0 | p3 18 c0 | | |
| 12 | p0 10 c1 | p0 13 c1 | p0 16 c1 | | |
| 13 | p0 11 c1 | p0 14 c1 | p0 17 c1 | | |
| 14 | p0 12 c1 | p0 15 c1 | p0 18 c1 | | |
| 15 | p1 10 c1 | p1 13 c1 | p1 16 c1 | | |
| 16 | p1 11 c1 | p1 14 c1 | p1 17 c1 | | |
| 17 | p1 12 c1 | p1 15 c1 | p1 18 c1 | | |
| 18 | p2 10 c1 | p2 13 c1 | p2 16 c1 | | |
| 19 | p2 11 c1 | p2 14 c1 | p2 17 c1 | | |
| 20 | p2 12 c1 | p2 15 c1 | p2 18 c1 | | |
| 21 | p3 10 c1 | p3 13 c1 | p3 16 c1 | | |
| 22 | p3 11 c1 | p3 14 c1 | p3 17 c1 | | |
| 23 | p3 12 c1 | p3 15 c1 | p3 18 c1 | | |

As described above, the RSA can selectively operate in at least three different modes including an: image filtering mode, an image resampling mode, and compression/decompression. Each of these operating modes will now be discussed in greater detail.

In the image filter mode, the RSA performs a standard FIR filtering, or convolution operation on an input image and produces an output image of the same size as the input image. The two filter units 10, 12 each implement a standard one-dimensional convolution equation:

$$y(n) = \sum_{k=0}^{B} h(k)x(n - k + 4)$$

In this equation, y(n) represents output pixel n, x(m) represents input pixel m, and h(k) represents the filter coefficient at tap k. For this configurations, the same filter coefficients are used to compute every output pixel, and therefore only one of the 32 coefficient locations per tap are utilized. The RSA first performs the horizontal filtering on incoming lines of the input image and writes the horizontally filtered lines to the external memories. Groups of nine horizontally filtered lines are then read by the vertical filter unit 12 to produce a line of the output image. The output pixels are output from the output port as they are computed. In actual operation, the horizontal and vertical filter units 10, 12 run simultaneously, throttled by the input and output port control signals.

In the image resampling mode of operation, The RSA produces an output image of a different size than the input image. Each 9-tap filter in the RSA implements a modified version of the FIR filter equation illustrated above. The expression for resampling with a 9-tap kernel is:

$$y(n) = \sum_{k=0}^{B} h(k,n')x(i - k + 4)$$

Where as before y(n) is output pixel n, x(m) is the input pixel m. This equation differs from a the standard convolution equation in the indexing of the input pixels and the coefficients h(k,n'). In the image resampling mode, the position of each output pixel is computed. The integer part of the output pixel position, i, is used to decide which nine input pixels to use. The fractional part of the output position is used to compute index n', the bin or sub-pixel index, which selects 1 of the 32 sets of coefficients to apply to the input pixels. As before, k selects one of the nine filter taps.

As in the filtering mode, the lines of the input image are first horizontally resampled and written to one of the external memories. Multiple horizontally filtered lines are then read from the external memories by the memory manager unit 14 into the vertical filter unit 12 to create one line of the output, resampled, image. When in resampling mode, all nine taps of both horizontal and vertical filter units may be used. However, when producing an output image with more pixels and lines than the input image, or interpolating, the RSA can be configured to run faster by using only four taps of the vertical filter unit 12 and all of the external memories. This special mode provides increased performance when using the common linear (2-tap) or cubic (4-tap) interpolation kernels.

Figure 9:
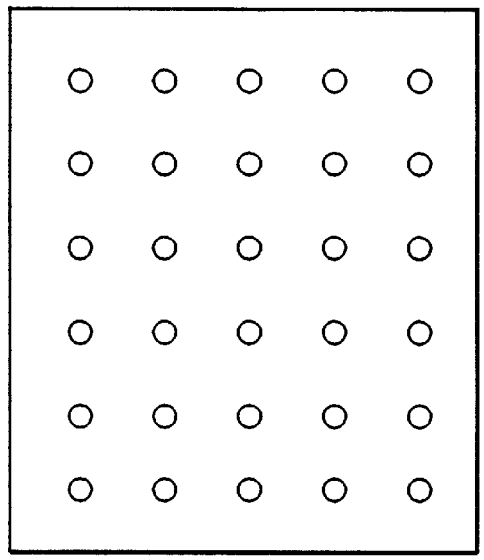
FIG. 9 illustrates an example of an input image.
Figure 10:
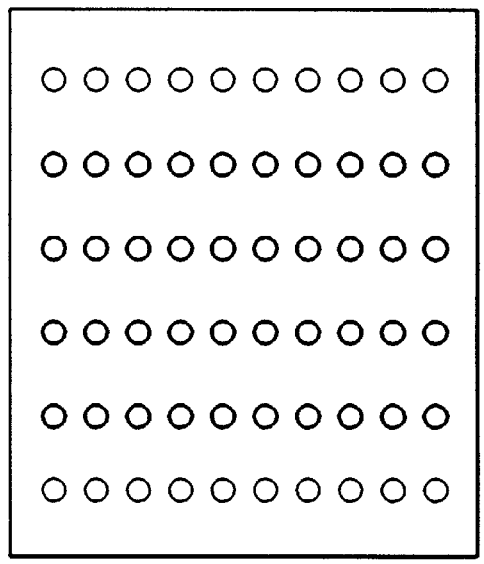
FIG. 10 illustrates the input image of FIG. 9 after horizontal filtering/resampling.
Figure 11:
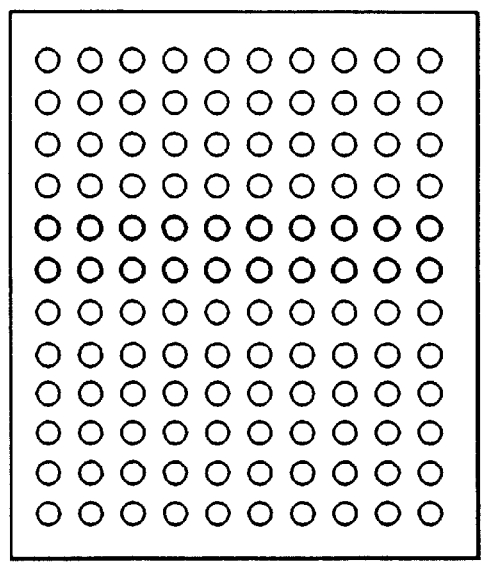
FIG. 11 illustrates the image shown in FIG. 108 after vertical filtering/rescaling.

FIGS. 9–11 shows an example of an input image which is interpolated by a factor of 2 in each direction. Each input line of FIG. 9 is interpolated horizontally, producing the intermediate data shown in FIG. 10. The four highlighted lines in FIG. 10 are read into the vertical filter unit 10 twice, to produce the two highlighted lines of FIG. 11. For each output line, a new n' is computed and used to select the vertical filter coefficients for computing all pixels of that line.

Figure 12:
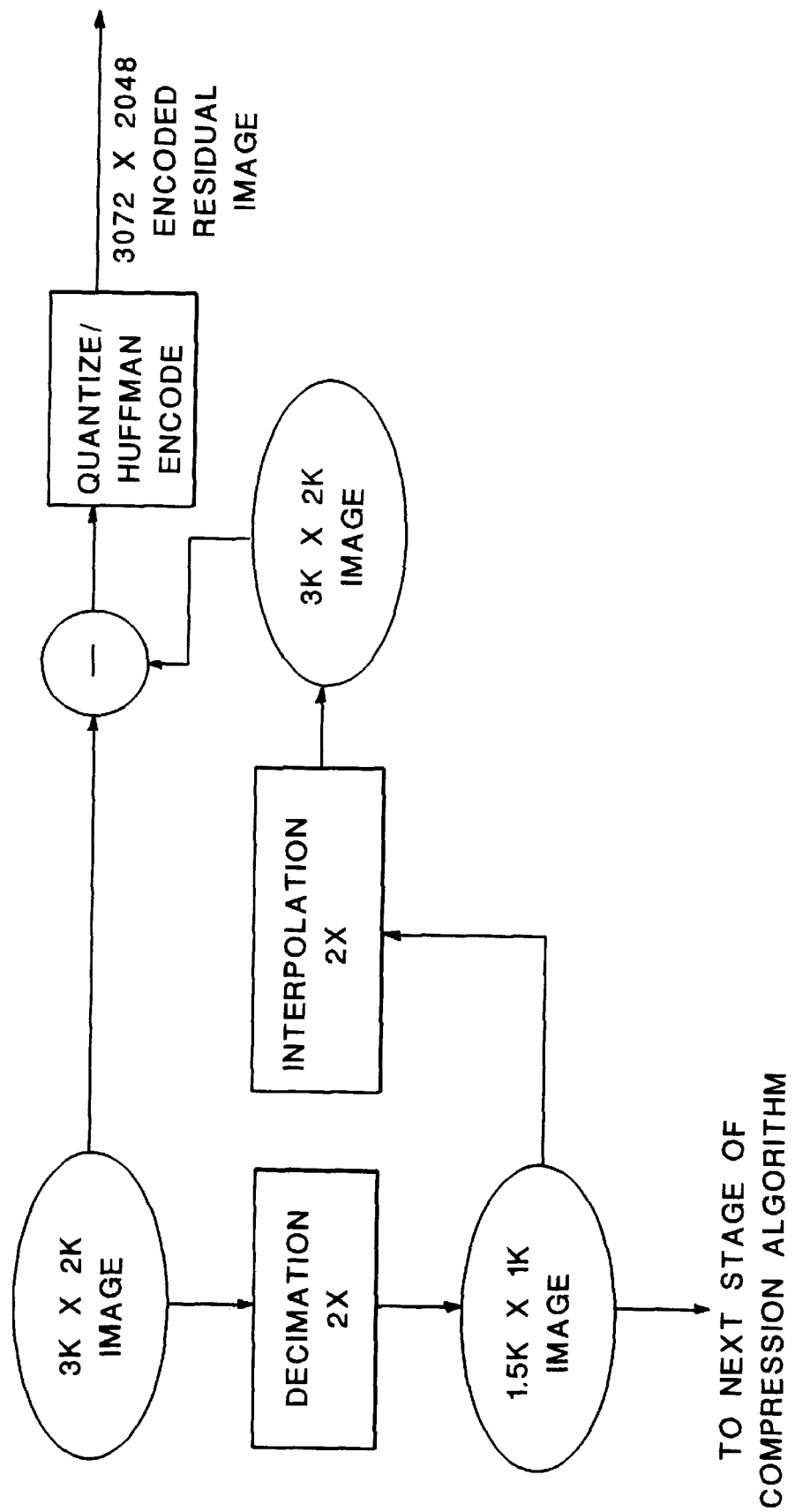
FIG. 12 is an example of a compression algorithm.

In the compression/decompression mode of operation, the RSA is used to efficiently perform part of a image compression or decompression algorithm. FIG. 12, for example, illustrates a compression algorithm that consists of a number of stages including image decimation, bilinear interpolation, residual image calculation, and Huffman encoding. The RSA can be used to perform the image decimation and bilinear interpolation parts of the compression algorithm, while circuitry external to the RSA performs the remainder of the compression algorithm. In the illustrated example, images are decimated and then interpolated by either a factor of 2.0 or 4.0 in each dimension. Similarly, the RSA can be used to perform 2D bilinear interpolation in exactly the same manner in a decompression operation.

In this mode of operation, lines of the original image are input to the RSA where they are horizontally reduced in size and written to the external memory banks. The vertical filter unit 12 then read the horizontally filtered lines from the memory banks to produce one line of the decimated image. While the decimated lines is output from the RSA it is also written back to the external memories through MUX 22. In between computation of the decimated lines, the vertical filter unit 12 is configured for 2D bilinear interpolation. The vertical filter reads two previously decimated lines from the memory banks and computes 2 (or 4) lines of the interpolated image, each line being 2 (or 4) times the size of the decimated line. Thus, the vertical filter unit 12 alternately computes lines of the decimated image and lines of the interpolated image. This mode of operation, together with external circuitry, reads the original image a single time while producing the decimated and residual images. Because the special case of reducing the size of an image by an integer factor only requires one set of filter coefficients, the remaining locations in the coefficient memories are used to store bilinear interpolation coefficients.

It should be noted that the input image data is preferably 8-bit unsigned integer data, with values ranging from 0 to 255, for the illustrated embodiment. The coefficient format can be configured to be either 8-bit unsigned integer, or an 8-bit modified 2's complement. In unsigned format, coefficients would range from 0–255. The modified 2's complement format is identical to standard 2's complement representation, except for the value of 10000000, which is used to represent a positive 128. The value 10000000 combined with scaling the filter output 128, allows a tap element to multiply a pixel by exactly 1.0, a value commonly used for interpolation kernals.

The tap element multipliers compute a 16-bit product which is input into the adder discussed above. The adder preferably generates a full-precision 20-bit adder sum which is then scaled by either 64 or 128, and clipped to range from 0 to 255. The scale factor together with the coefficient format determines the effective filter coefficient range. Table 4 is illustrates four possibilities of effective range of the filter coefficients.

TABLE 4

| Coefficient Format | Coefficient Range | Scale Factor | Effective Range |
|---|---|---|---|
| unsigned | 0 --→ 255 | 64 | 0.0 --→ 3.984 |
| unsigned | 0 --→ 255 | 128 | 0.0 --→ 1.992 |
| modified 2's complement | −127 --→ 128 | 64 | −1.984 --→ 2.0 |
| modified 2's complement | −127 --→ 128 | 128 | −0.992 --→ 1.0 |

In the preferred embodiment, the configuration register unit 16 includes a mode register, an output pixels/line register, an input pixels/line register, an output lines register, and input lines register, and output line spacing register, and an output pixel spacing register. The mode register includes: a vertical filter length bit that is set (1) to use four taps and all five memory banks and reset (0) to use all nine taps with four memory banks; a two's complement coefficients bit that is set to use 8-bit modified 2's complement representation of the filter coefficients; a filter scale factor bit that is set to scale both filter outputs by a factor of 64 or six binary digits and reset to scale the filter outputs by a factor of 128 or seven binary digits; a compression/decompression mode bit that is set to perform simultaneous decimation and bilinear interpolation for the compression/decompression mode and reset to perform image filtering and image resampling; a compression/decompression interpolation factor bit which is set to perform interpolation by 4× in each dimension and reset to use 2× interpolation; two bits to define the number of color components; and input strobe polarity bit which is set to indicated active-high input data strobe and reset to indicate an active-low strobe; and an output strobe polarity bit that is set to indicate an active-high output data strobe and reset to indicate an active-low strobe. The output pixels/line register contains a 13-bit number representing the number of pixels/lines in the output image less one. The input pixels/line register contains a 13-bit number representing the number of pixels/line in the input image less one. The output lines register is a register containing a 14-bit number representing the number of lines in the output image less one. The input lines register contains a 14-bit number representing the number of lines in the input image less one. The output line spacing register contains the spacing between output lines relative to the input line spacing. The output pixel spacing register contains the spacing between output pixels relative to the input pixel spacing.

There are a total of 576 8-bit filter coefficients to be loaded (2 filters×9 tape/filter×32 coefficients/tap) in the preferred embodiment. The coefficients are preferably loaded into the horizontal filter unit 10 first and then into the vertical filter unit 12, and from tap 0 to tap 8 in each of the filter units. For each tap, the 32 coefficients are loaded from bin 0 to bin 31. The coefficient memory addresses are generated by an internal address counter which is not shown.

The invention has been described with reference to a preferred embodiment thereof. It will be understood, however, that modification and variations are possible within the scope of the appended claims.

Industrial Utility

The invention provides an RSA that can be utilized in a number of electronic image processing systems or devices, including film or print scanners, image processing accelerators or digital hard copy printers, to increase or decrease the size of an original image. The invention is particularly useful in implementing an electronic zoom feature in such systems or devices.

| PARTS LIST | |
|---|---|
| 10 | Horizontal Filter Unit |
| 11 | Input Port |
| 12 | Vertical Filter Unit |
| 13 | Output Port 13 |
| 14 | Memory Manager Unit |
| 15 | Memory port |
| 16 | Configuration Register Unit |
| 17 | Configuration Port 17 |
| 18 | Horizontal Position Accumulator |
| 20 | Vertical Position Accumulator |
| 22 | Multiplexer |
| 30 | 8-bit Multiplier 30 |
| 32 | Coefficient RAM Memory |
| 34 | Input Register |
| 36 | Output Register |
| 38 | Multiplexer |

What is claimed is:

1. A circuit comprising:
a horizontal filter unit; a vertical filter unit separate from said horizontal filter unit; a memory manager unit; means for selectively alternately interleaving outputs of the horizontal and vertical filter units to an input of the memory manager unit; a horizontal position accumulator coupled to the horizontal filter unit, a vertical position accumulator coupled to the vertical filter unit; and data entry means for loading coefficient data into the horizontal and vertical filter units and for loading data for calculating the position of each output pixel or line into the horizontal and vertical position accumulator; and wherein said memory manager unit, during a computation period of operation in a first data processing mode, is operative to interleave writes to a memory of first intermediate data output by the horizontal filter unit before said first intermediate data is operated on by the vertical filter unit with writes to the memory of second intermediate data from the vertical filter unit, the second intermediate data being data operated upon by both the horizontal filter unit and the vertical filter unit in accordance with the first data processing mode of operation of the circuit, the memory manager unit being further operative during said computation period to alternately interleave with said writes alternate reads from said memory to said vertical filter unit of said first intermediate data for processing by said vertical filter unit in accordance with said first mode of operation and said second intermediate data for processing by said vertical filter unit in accordance with said second mode of operation without further processing of said second intermediate data by said horizontal filter unit.

2. A circuit as claimed in claim 1, wherein the horizontal and vertical filter units include a plurality of tap elements and wherein each respective tap element includes a multiplier and a coefficient memory for storing plural selectable coefficients for exclusive use of the respective tap element.

3. A circuit as claimed in claim 2, wherein the data entry means loads modified 2's complement coefficient data into the coefficient memory.

4. A circuit as claimed in claim 2, wherein each tap element includes a DATA-IN port and a DATA-OUT port, the DATA-IN port of the first tap element of the horizontal filter unit is connected to an input port of the circuit, the DATA-OUT port of each tap element in the horizontal filter unit feeds the DATA-IN port of the next tap element, and the DATA-IN port of the tap elements of the vertical filter unit are connected in parallel to the memory management unit.

5. A circuit of claim 3 wherein the modified complement data is identical to standard 2's complement representation, except for the value of 10000000, which in modified 2's complement represents a positive value 128 to allow a multiplication of exactly 1.0.

6. A circuit of claim 1 and wherein said vertical filter unit is operative to alternately compute lines of decimated image data lines and interpolated image data during said computation period.

7. An image processing system comprising:
a horizontal resampling unit for generating first intermediate resampled data;
a vertical resampling unit separate from said horizontal unit for operating on said first intermediate resampled data to generate second intermediate resampled data;
a memory manager unit;
memory means coupled to the memory manager unit for storing the first intermediate data from the horizontal resampling unit and the second intermediate data from the vertical resampling unit;
said memory manager unit including means for connecting an output of the horizontal resampling unit to an input of the memory means for storing the first intermediate data from said horizontal resampling unit in the memory means and means for connecting an input of the vertical resampling unit to the memory means so that said vertical resampling unit alternately receives from the memory means the first and second intermediate data stored in the memory means; and
wherein the memory manager unit controls the operation of the memory means to interleave writes to the memory means of intermediate data from the horizontal resampling unit with writes to the memory means of the second intermediate data from the vertical resampling unit, the vertical resampling unit being alternately operative in first and second different resampling processing modes wherein in said first mode said vertical sampling unit operates on said first intermediate data and in said second mode said vertical resampling unit operates on said second intermediate data.

8. An image processing system as claimed in claim 7, wherein the horizontal and vertical resampling units each include a plurality of tap elements, each tap element comprising a multiplier and a coefficient memory.

9. An image processing system as claimed in claim 8, and including data entry means for loading modified 2's complement coefficient data into the coefficient memory.

10. An image processing system as claimed in claim 8, wherein each tap element further comprises a DATA-IN port and a DATA-OUT port, the DATA-IN port of the first tap element of the horizontal resampling unit is connected to an input port of the horizontal resampling unit, the DATA-OUT port of each of plural tap elements in the horizontal resampling unit is connected to a DATA-IN port of the next tap element, and the DATA-IN ports of the tap elements of the vertical resampling unit are connected in parallel to the memory management unit.

11. An image processing system as claimed in claim 7, wherein means are provided for selectively operating the filter units in an image filtering mode, an image resizing mode, and a compressor/decompression mode.

12. A circuit for selectively performing filtering, resizing and compression of input digital image data representing the intensity of each input pixel, said apparatus comprising:

a horizontal filter for filtering the input digital image data to generate intermediate digital image data representing the intensity of each intermediate pixel;

a horizontal position accumulator for controlling said horizontal filter;

a vertical filter, separate from said horizontal filter, for filtering the intermediate digital image data to generate output digital image data representing the intensity of each output pixel;

a vertical position accumulator for controlling said vertical filter;

memory means for storing the intermediate digital image data;

a memory manager unit connecting said horizontal and vertical filters to said memory means;

means for selectively controlling said horizontal and vertical filters and their corresponding horizontal and vertical accumulators to select filtering, resizing and compression operations on said input digital image data; and wherein the horizontal and vertical filters each include a plurality of tap elements wherein said tap elements each respectively include a coefficient memory for storing plural selectable coefficients for exclusive use by said tap element and means are provided for selecting one of said coefficients from said coefficient memory for use in a filtering operation by said tap element.

13. The circuit of claim 12 wherein each tap element includes a data input port for receiving image data and means for multiplying image data input into the tap element by a coefficient multiplier value and a data output port and further wherein the tap elements in the horizontal filter are connected so that at least some of the tap elements feed data output from an output port of the tap element to an input port of a next tap element.

14. The circuit of claim 13 and wherein tap elements of said vertical filter are connected in parallel to the memory manager unit.

15. An apparatus for selectively filtering, scaling or resizing, and compressing input digital image data of plural rows of the apparatus comprising:

a horizontal filter unit for selectively operating on the image data using respective coefficients to filter or change the number of pixels associated with each horizontal row of the input digital image to create intermediate data representing lines of an intermediate digital image;

a vertical filter unit for selectively operating on the intermediate data using respective coefficients to filter or change the number of pixels associated with each vertical column of the intermediate digital image to create columns of an output digital image;

a memory manager unit for coupling the horizontal filter unit to a plurality of memory banks, and for coupling these same external memory banks to the vertical filter unit;

a horizontal position accumulator for controlling the horizontal filter unit, and a vertical position accumulator for controlling the operation of the vertical filter unit; and a data entry means for selectively enabling the filter units and position accumulator units to perform either filtering, resizing, or compression of the input digital image; wherein the horizontal and vertical filter units include a plurality of tap elements, with each tap element having a coefficient memory that stores a plurality of coefficients from which only that respective tap element is provided a coefficient for operating on image data.

16. The apparatus of claim 15 wherein the horizontal position accumulator unit includes means for computing a position of each intermediate image pixel and generates control signals to the vertical filter unit to select which multiplication factors and which input values are used to compute each intermediate image pixel value.

17. The apparatus of claim 16 wherein the vertical position accumulator unit includes means for computing the position of output image pixels and generates control signals to the vertical filter unit to select which coefficients and which intermediate image values are used to compute each output image pixel value.

18. The apparatus of claim 17 wherein the horizontal and vertical filter units use modified 2's complement representation for the multiplication factors.

19. The apparatus of claim 18 wherein the memory manager unit includes means for a controlling a number M of memory banks for supplying N lines of intermediate image data to the vertical filter unit and wherein M is less than N.

20. The apparatus of claim 19 and wherein the horizontal and vertical filter units, the memory manager unit, the horizontal and vertical position accumulators are formed together on an integrated circuit chip.

21. The apparatus of claim 15 and wherein there is included means for inputting digital image data of multi-bits per pixel.

22. The apparatus of claim 15 and wherein the memory manager unit includes means for interleaving write to the memory banks of intermediate data from the horizontal filter unit with reads from the memory banks of intermediate data by the vertical filter unit.

23. The apparatus of claim 15 including means for selecting filter coefficients on a pixel by pixel basis of image data that contains more than one color component.

24. A method for selectively performing filtering, resizing and compression of input digital image data representing the intensity of each input pixel, said method comprising the steps of:

inputting digital data into a horizontal filter to filter the input digital image data and generate intermediate digital image data representing the intensity of each intermediate pixel;

operating a horizontal position accumulator for controlling said horizontal filter;

operating a vertical filter, separate from said horizontal filter, for filtering the intermediate digital image data to generate output digital image data representing the intensity of each output pixel;

operating a vertical position accumulator for controlling said vertical filter;

storing the intermediate digital image data in a memory;

selectively controlling said horizontal and vertical filters and their corresponding horizontal and vertical accumulators to select filtering, resizing and compression operations on said input digital image data; and wherein the horizontal and vertical filters each include a plurality of tap elements and wherein said tap elements each include a coefficient memory and including the step of storing plural selectable coefficients in the coefficient memory and selecting one of said coefficients from said coefficient memory for operating a respective tap element.

25. The method of claim 24 and wherein the input image data contains more than one color component and wherein coefficients from said memory are selectable on a pixel by pixel basis.

26. The method of claim 24 and including the step of interleaving lines of writes to the memory of a intermediate data from the horizontal filter with writes to the memory of second intermediate date generated by the vertical filter.

27. A method for resampling of input digital image data comprising:

inputting into respective first taps of a first filter unit respective input image data of first pies arranged in one direction;

selecting a first coefficient from a respective first memory associated with each respective first tap, which respective first memory stores a set of plural first coefficients which are selectable only for use in processing the respective input image data of respective pixels input to the respective first tap in accordance with a resampling process in said one direction;

processing the respective input image data of said first pixels with at least some first taps using respective different first coefficients to resample said first pixels in said one direction to generate rows of intermediate image data of second pixels;

inputting columns of said intermediate image data into respective second taps of a second filter unit;

selecting a second coefficient from a respective second memory associated with each respective second tap, which respective second memory stores a set of plural second coefficients accessible only to a respective second tap for use in processing by said second filter unit the respective input intermediate image data of a respective one of said second pixels; and processing the respective input image data of said second pixels by said second filter unit using respective second coefficients to resample said second pixels in said second direction to generate columns of resampled image data.

28. The method of claim 27 wherein a position accumulator is used to select a first coefficient from a respective first memory based on a spacing of a new pixel to be formed between two pixels input to respective taps of the first filter unit.

29. The method of claim 27 wherein the image data for each pixel is a multibit digital signal.

30. The method of claim 27 wherein a resampling process employs an n-bit coefficient in n-bit modified complement form that includes a digital "1" at the most significant bit followed by a string of only digital "0's" to represent the most positive number of the n-bit coefficient range to effect after scaling a multiplication of exactly 1.0.

31. The method of claim 27 wherein a third memory receives inputs of intermediate image data prior to input into the second filter unit and inputs of resampled image data after processing by said second filter unit and wherein lines of intermediate image data are interleaved in said memory with lines of resampled image data and said second filter unit alternately processes columns of intermediate image data with columns of resampled image data.

32. The method of claim 27 wherein a third memory includes plural memories and receives input of intermediate image data and the number of plural memories is fewer than the number of taps in said first filter unit.

33. A method for resampling of input digital image data comprising:

inputting into a first filter unit respective input image data of first pixels arranged in one direction;

processing the respective input image data of said first pixels using respective first coefficients to resample said first pixels in said one direction to generate rows of first intermediate image data of second pixels;

storing the first intermediate image data in a memory;

outputting the first intermediate image data from said memory;

inputting the first intermediate image data output from said memory into a second filter unit;

processing the first intermediate image data in said second filter unit using respective second coefficients to resample the second pixels using said second coefficients in a second direction that is different from said first direction to generate second intermediate image data of third pixels;

storing the second intermediate image data in said memory;

outputting the second intermediate image data from said memory;

inputting the second intermediate image data output from said memory into the second filter unit for resampling the third pixels using third coefficients to generate image data of fourth pixels;

wherein processing in said second filter unit is controlled to alternately process said first intermediate image data in accordance with one resampling operation and said second intermediate image data in accordance with a second resampling operation.

* * * * *